US011857870B2

(12) United States Patent
Min et al.

(10) Patent No.: US 11,857,870 B2
(45) Date of Patent: Jan. 2, 2024

(54) METHOD AND APPARATUS FOR GAME INTERFERENCE PROCESSING, AND MOBILE TERMINAL

(71) Applicant: OnePlus Technology (Shenzhen) Co., Ltd., Shenzhen (CN)

(72) Inventors: Zeke Min, Shenzhen (CN); Lei Huang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 258 days.

(21) Appl. No.: 17/358,182

(22) Filed: Jun. 25, 2021

(65) Prior Publication Data

US 2021/0316211 A1    Oct. 14, 2021

Related U.S. Application Data

(63) Continuation of application No. PCT/CN2019/126952, filed on Dec. 20, 2019.

(30) Foreign Application Priority Data

Dec. 27, 2018  (CN) .......................... 201811615676.6

(51) Int. Cl.
*A63F 13/332*     (2014.01)
*A63F 13/87*      (2014.01)

(52) U.S. Cl.
CPC ............ *A63F 13/332* (2014.09); *A63F 13/87* (2014.09); *A63F 2300/406* (2013.01)

(58) Field of Classification Search
CPC .. A63F 13/332; A63F 13/87; A63F 2300/406; H04W 8/183; H04W 36/0022;
(Continued)

(56) References Cited

U.S. PATENT DOCUMENTS 7,254,119 B2 *   8/2007   Jiang ..................... H04W 12/08
                                                        370/328
7,489,659 B2 *   2/2009   Siorpaes ............... H04W 8/087
                                                        370/349
(Continued)

FOREIGN PATENT DOCUMENTS

CN        106973167 A       7/2017
CN        107124516 A       9/2017
(Continued)

OTHER PUBLICATIONS

India Patent Office, Examination Report, IN Application No. 202117033512, dated Mar. 9, 2022.
(Continued)

*Primary Examiner* — Michael A Cuff
(74) *Attorney, Agent, or Firm* — Hodgson Russ LLP (57) ABSTRACT

Disclosed are a method and an apparatus for game interference processing and a mobile terminal. The method includes: determining whether a SIM card in the mobile terminal is registered in an IMS network when the mobile terminal is in a game mode; sending, by a protocol stack of the mobile terminal, a response message of no expectation to fallback to a network side after receiving a CS paging from the network side, when the SIM card is not registered in the IMS network; and sending, by the protocol stack, to the network side a notification message indicating that the current SIM card does not expect to continue to respond to a CS service when receiving paging of the CS service in the current network from the network side, and controlling the mobile terminal to stay in the game mode all the time.

15 Claims, 7 Drawing Sheets

(58) Field of Classification Search
CPC ............. H04W 65/1073; H04W 48/02; H04W 68/005; H04W 65/1016
USPC .......................................................... 463/42
See application file for complete search history.

(56) References Cited

U.S. PATENT DOCUMENTS

| | | | |
|---|---|---|---|
| 8,594,628 B1* | 11/2013 | Schroeder | H04W 12/062 |
| | | | 455/410 |
| 9,148,776 B1* | 9/2015 | Schroeder | H04L 61/4588 |
| 10,069,961 B2 | 9/2018 | Han | |
| 2014/0355586 A1* | 12/2014 | Tuttle, Jr. | H04W 4/14 |
| | | | 370/338 |
| 2015/0148048 A1 | 5/2015 | Jamadagni et al. | |
| 2016/0164926 A1* | 6/2016 | Zehavi | H04W 8/20 |
| | | | 455/432.1 |
| 2017/0094652 A1* | 3/2017 | Yang | H04W 72/51 |
| 2017/0325130 A1 | 11/2017 | Purohit et al. | |
| 2018/0098238 A1* | 4/2018 | Saxena | H04W 36/0066 |
| 2018/0213586 A1* | 7/2018 | Chong | H04W 48/06 |

FOREIGN PATENT DOCUMENTS

| | | |
|---|---|---|
| CN | 108683806 A | 10/2018 |
| CN | 108737621 A | 11/2018 |
| CN | 108833686 A | 11/2018 |
| CN | 108924339 A | 11/2018 |
| CN | 109246315 A | 1/2019 |
| CN | 109743760 A | 5/2019 |
| EP | 3806439 | 4/2021 |
| GB | 2358112 A | 7/2001 |
| WO | 2000013428 A2 | 3/2000 |

OTHER PUBLICATIONS

"3rd Generation Partnership Project; Technical Specification Group Services and System Aspects; Circuit Switched (CS) fallback in Evolved Packet System (EPS); Stage 2 (Release 15)," 3GPP TS 23.272, Dec. 2017, v15.0.0.
EPO, Extended European Search Report for EP Application No. 19905347.1, dated Aug. 17, 2022.
International Search Report and Written Opinion of the International Searching Authority, issued in PCT/CN2019/126982, dated Feb. 26, 2020; ISA/CN.

* cited by examiner

METHOD AND APPARATUS FOR GAME INTERFERENCE PROCESSING, AND MOBILE TERMINAL

CROSS-REFERENCE TO RELATED APPLICATIONS

This application is a continuation of International Application No. PCT/CN2019/126952 filed Dec. 20, 2019 which claims priority of the Chinese patent application No. 201811615676.6 filed in Chinese Patent Office on Dec. 27, 2018, with a title of "METHOD AND APPARATUS FOR GAME INTERFERENCE PROCESSING, AND MOBILE TERMINAL", the entire contents of which are incorporated herein by reference.

TECHNICAL FIELD

This application relates to the technical field of wireless communication, and in particular, to a method and an apparatus for game interference processing, and a mobile terminal.

BACKGROUND

With the development of mobile communication technology and the popularity of intelligent mobile terminals, mobile terminals play an increasingly important role in users' lives, and users can make calls, shopping and play games through mobile terminals.

Since users need to connect to the Internet when playing online games, they usually connect to the Internet through WiFi when there is WiFi. In the absence of WiFi, users may connect to the Internet through data networks. In order to get a good game experience, two conditions may need to be met: first, since online games need to download information such as scenes and tasks in the games, the speed of the network connected by the mobile terminal may need to reach a standard of smooth game; second, users should not be disturbed by other services during the games, such as calling.

In the current mobile network, the services supported by SIM cards are divided into two types: one is CS (Circuit Switched) service, which is generally voice service; the other is PS (Packet Switched) service, which is generally data service. However, in the current design of protocol stack, the priority of CS service is higher than that of PS service, which means that when there is a voice call such as CS telephone, the mobile terminal will immediately respond to the call. The PS service will be interrupted when the terminal responds to the paging through CSFB. For online games that provide high requirements for network speed and delay, data interruption will seriously affect the users' game experience.

SUMMARY

In view of the above problems, a method and an apparatus for game interference processing and a mobile terminal are provided, to solve the shortcomings of the prior art.

According to an embodiment of the application, a method for game interference processing applied to a mobile terminal is provided, which includes:

determining whether a SIM card in the mobile terminal is registered in an IMS network when the mobile terminal is in a game mode, wherein the game mode is a mode in which any online game is in a running state;

sending, by a protocol stack of the mobile terminal, a response message of no expectation to fallback to a network side after receiving a CS paging from the network side, when the SIM card is not registered in the IMS network; and sending, by the protocol stack, to the network side a notification message indicating that the current SIM card does not expect to continue to respond to a CS service when receiving paging of the CS service in the current network from the network side, so that the network side discards the CS service according to the notification message, and controlling the mobile terminal to stay in the game mode all the time.

The above method for game interference processing further includes:

making, by the protocol stack, a response to the paging through VOLTE when the SIM card is registered in the IMS network.

In the above method for game interference processing, the response message includes a fallback flag bit; and sending, by the protocol stack of the mobile terminal, the response message of no expectation to fallback to the network side includes:

setting, by the protocol stack, the fallback flag bit as an unexpected fallback flag when the SIM card is a Mobile or Unicom SIM card, and sending the set response message to the network side.

In the above method for game interference processing, sending, by the protocol stack of the mobile terminal, the response message of no expectation to fallback to the network side includes:

setting, by the protocol stack, the SIM card to a mode of responding to the CS service only in the current network when the SIM card is a Telecom SIM card, and sending a response message of responding to the CS service only in the current network to the network side.

In the above method for game interference processing, before the mobile terminal is in the game mode, the method includes:

switching the mobile terminal to the game mode in response to an input operation of a user in a plurality of game mode options preset by the mobile terminal.

In the above method for game interference processing, the mobile terminal is provided with a physical switch; and before the mobile terminal is in the game mode, the method includes:

switching the mobile terminal to the game mode in response to a trigger operation of the user on the physical switch.

The above method for game interference processing further includes:

making, by an AP of the mobile terminal, no response to other PS services except games when receiving paging of the other PS services in the current network from the network side.

According to another embodiment of the present application, an apparatus for game interference processing applied to a mobile terminal is provided, which includes:

a determination module, configured to determine whether a SIM card in the mobile terminal is registered in an IMS network when the mobile terminal is in a game mode, wherein the game mode is a mode in which any online game is in a running state;

a sending module, configured to send a response message of no expectation to fallback to a network side after receiving a CS paging from the network side, when the SIM card is not registered in the IMS network; and a discarding module, configured to send to the network side a notification message indicating that the current SIM card does not expect to continue to respond to a CS service when receiving paging of the CS service in the current network from the network side, so that the network side discards the CS service according to the notification message, and control the mobile terminal to stay in the game mode all the time.

According to yet another embodiment of the present application, a mobile terminal is provided, which includes a memory for storing a computer program and a processor, where the processor runs the computer program to make the mobile terminal execute the above method for game interference processing.

According to yet another embodiment of the present application, a computer readable storage medium is provided, where the computer readable storage medium stores the computer program used in the above mobile terminal.

According to another embodiment of the present application, a method for interference processing applied to a mobile terminal is provided, which includes:

determining whether a SIM card in the mobile terminal is registered in an IMS network when the mobile terminal is in a preset mode, where the preset mode is a mode when a corresponding preset operation is executed, and the preset operation belongs to a PS service;

sending, by a protocol stack of the mobile terminal, a response message of no expectation to fallback to a network side after receiving a CS paging from the network side, when the SIM card is not registered in the IMS network; and sending, by the protocol stack, to the network side a notification message indicating that the current SIM card does not expect to continue to respond to a CS service when receiving paging of the CS service in the current network from the network side, so that the network side discards the CS service according to the notification message, and controlling the mobile terminal to stay in the preset mode all the time.

The technical scheme provided by the embodiments of the disclosure can contain the following beneficial effects.

In a method and an apparatus for game interference processing, and a mobile terminal of the present application, when the mobile terminal is in a game mode, if a protocol stack of the mobile terminal receives paging of a CS service from a network side, the protocol stack informs the network side of a message of no expectation to fall back, so that the network side only pages a CS service in the current network, thus avoiding the problems that users are interrupted by voice service in the game state and the game is interrupted due to the decrease of network speed after the network falls back, and improving user experience.

In order to make the above objects, features and advantages of this application more obvious and understandable, the following is a detailed description of the preferred embodiments in combination with the drawings.

BRIEF DESCRIPTION OF DRAWINGS

In order to explain the technical scheme of this application, the following drawings used in the embodiments will be introduced. It should be understood that the following drawings show some embodiments of this application, which are not regarded as a limitation of the protection scope of this application. For those having ordinary skill in the art, other related drawings can be obtained according to these drawings without paying creative labor.

DESCRIPTION OF MAIN COMPONENT SYMBOLS

500—apparatus for game interference processing; 510—determination module; 520—sending module; 530—discarding module;

100—mobile terminal; 110—RF circuit; 120—memory; 130—input unit; 140—display unit; 150—shooting unit; 160—audio circuit; 170—WiFi module; 180—processor; 190—power supply.

DETAILED DESCRIPTION

The technical scheme in the embodiments of the present application will be described with reference to the drawings in the embodiments of the present application. Obviously, the described embodiments are part of the embodiments of the present application, not all of them. The components of the embodiments of the present application generally described and illustrated in the drawings herein may be arranged and designed in various different configurations. Therefore, the following detailed description of the embodiments of the present application provided in the drawings is not intended to limit the scope of the claimed application, but represents selected embodiments of the present application. Based on the embodiments of the present application, all other embodiments obtained by those having ordinary skill in the art without creative labor belong to the protection scope of the present application.

Embodiment One

Figure 1:
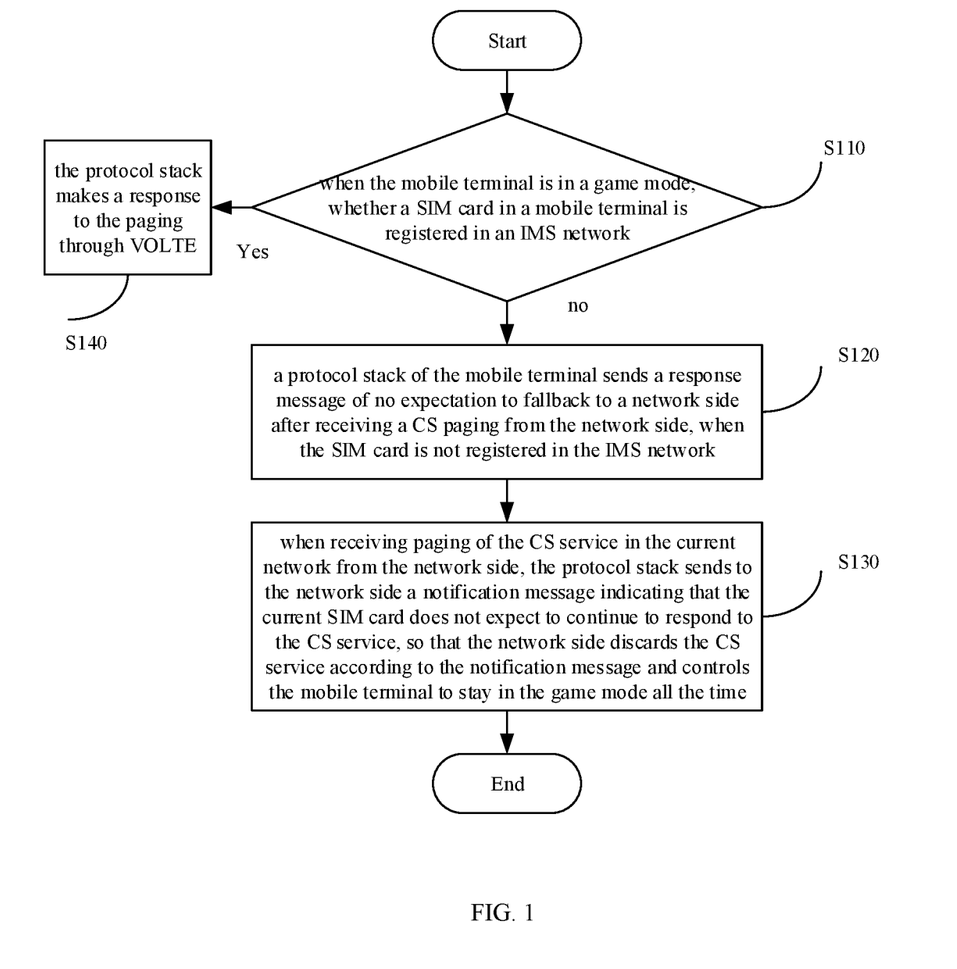
FIG. 1 is a flow diagram of a method for game interference processing according to embodiment one of the present application.

FIG. 1 is a flow diagram of a method for game interference processing according to embodiment one of the present application. The method is applied to a mobile terminal, which may be in a standby mode, a video mode and the like, and a SIM card currently used in the mobile terminal can support a PS service and a CS service.

The mobile terminal may include any terminal equipment such as a computer (personal computer), a mobile phone, a tablet computer, a PDA (Personal Digital Assistant), a vehicle-mounted computer, and the like.

In this embodiment, the SIM card may be a SIM card of operators such as China Mobile, China Unicom and China Telecom. In some other embodiments, with the development of mobile communication technology, the SIM card may also be a SIM card produced with the emerging technology.

It is worth noting that the SIM card can support TD-LTE, FDD-LTE, TD-SCDMA, WCDMA, CDMA, CDMA2000, GSM and other standards. With the development of 5G technology and subsequent communication technology, the SIM card can also support other emerging standards.

Among all current network standards, each operator is compatible with 3-4 network standards, for example, Mobile network supports GSM(2G), TD-SCDMA(3G), TD-LTE (4G) or FDD-LTE (4G); Unicorn network supports GSM (2G), WCDMA(3G) and FDD-LTE(4G) or TD-LTE (4g); Telecom network supports CDMA(2G), CDMA2000(3G) and FDD-LTE(4G).

In the current mobile terminal, if there are 5G network, 4G network, 3G network and 2G network at the same time, the current SIM card will generally connect to the 5G network first. If the 5G network cannot be connected, the terminal will try to connect to the 4G network, the 3G network and the 2G network in turn.

The method for game interference processing includes the following steps.

At step S110, when the mobile terminal is in a game mode, whether a SIM card in a mobile terminal is registered in an IMS network is determined.

The game mode is a mode in which any online game is in a running state.

The mode in which any online game is in a running state in the mobile terminal is defined as the game mode.

Due to online games have a high demand for mobile network speed, users usually connect to the Internet through 4G mobile network, 5G mobile network or higher-level and higher-speed mobile network generated with the development of mobile communication technology, and download resources such as scenes, sound effects and props of online games.

The SIM card for any operator prestores the information of whether the mobile network corresponding to different network standards supports an IMS architecture or not.

When the mobile terminal is in the game mode, the network standard accessed by the current SIM card in the game mode is acquired, and whether the mobile network corresponding to the current SIM card supports the IMS architecture is determined according to the prestored information of whether the mobile network corresponding to different network standards supports the IMS architecture or not.

The IMS architecture has many characteristics, such as providing multimedia services, horizontal service structure, access independence and adopting Telecom "IT" protocol SIP. The IMS architecture is the architecture goal of the next generation mobile core network, which can well meet the corresponding requirements.

In this embodiment, the current architecture supported by the network is the IMS architecture. In some other embodiments, besides the IMS architecture, other architectures with similar functions to the IMS architecture, such as the upgraded version and the optimized version of the IMS architecture, are also within the protection scope.

When the network connected by the SIM card supports the IMS architecture, whether the SIM card is registered in the IMS network is determined.

If the SIM card is not registered in the IMS network, proceed to step S120; and if the SIM card is registered in the IMS network, proceed to step S140.

At step S120, if the current network does not support the IMS architecture, after receiving a CS paging from a network side, a protocol stack of the mobile terminal sends a response message of no expectation to fallback to the network side.

Generally speaking, in absence of WiFi at present, in order to ensure fluency of online games, users often connect to the internet through 4G mobile network, 5G mobile network or higher-level and faster mobile networks generated with the development of science and technology. If the current network connected by the SIM card for connecting mobile network is 4G mobile network and the 4G network does not support the IMS architecture, the protocol stack, when receiving the CS paging from the network side, will fall back to 2G or 3G through CSFB (Circuit Switched Fallback) to respond, and the SIM card needs to be disconnected from the current connected 4G network and re-registered to the 3G network, resulting in the SIM card being not connected to the network within a time period ranging from disconnection with the 4G network to re-registration to the 3G network, and resulting in the interruption of PS service.

In addition, after the current network connected by the SIM card falls back to the 3G network, the CS service and PS service corresponding to the SIM card are carried out under the 3G network. Since the speed of the 3G network is not enough to meet the user's demand for fluency in the game process, and the interface where the CS service is located pops up during the game, the user's experience during the game is poor.

Therefore, after the mobile terminal receives the CS paging from the network side, the protocol stack sends a response message of no expectation to fallback of the current network to the network side, so that the network side can only page CS service in the current mobile network after receiving the response message, thus preventing the network side from constantly paging the mobile terminal for the user, resulting in signaling congestion on the network side.

It is worth noting that it is also possible to determine whether the current network connected by the SIM card of the mobile terminal supports the IMS architecture after receiving the CS paging from the network side.

At step S130, when receiving paging of the CS service in the current network from the network side, the protocol stack sends to the network side a notification message indicating that the current SIM card does not expect to continue to respond to the CS service, so that the network side discards the CS service according to the notification message, and controls the mobile terminal to stay in the game mode all the time.

When the mobile terminal is in the game mode, the SIM card currently used is defined to support the PS service only, with the CS service being not supported.

When the protocol stack receives paging of the CS service in the current network from the network side, since the current SIM card does not support the CS service in the game mode, the protocol stack sends a notification message indicating that the current SIM card supports the PS service rather than the CS service to the network side. After receiving the notification message, the network side discards the CS service and no longer paging the CS service in the current network.

At step S140, the protocol stack makes a response to the paging through VOLTE.

When the network to which the SIM card is currently accessed supports the IMS architecture, the protocol stack responds to the CS paging sent from the network side through VOLTE (Voice over LTE). However, since the currently used SIM card is predefined to support the PS service rather than the CS service when the mobile terminal is in the game mode, the protocol stack sends the notification message indicating that the current SIM card supports the PS service rather than the CS service to the network side. After receiving the notification message, the network side discards the CS service and no longer pages CS service in the current network.

It is worth noting that when the currently accessed network supports other architectures, other services may also be used as a response to the CS paging sent from the network side.

Embodiment Two

Figure 2:
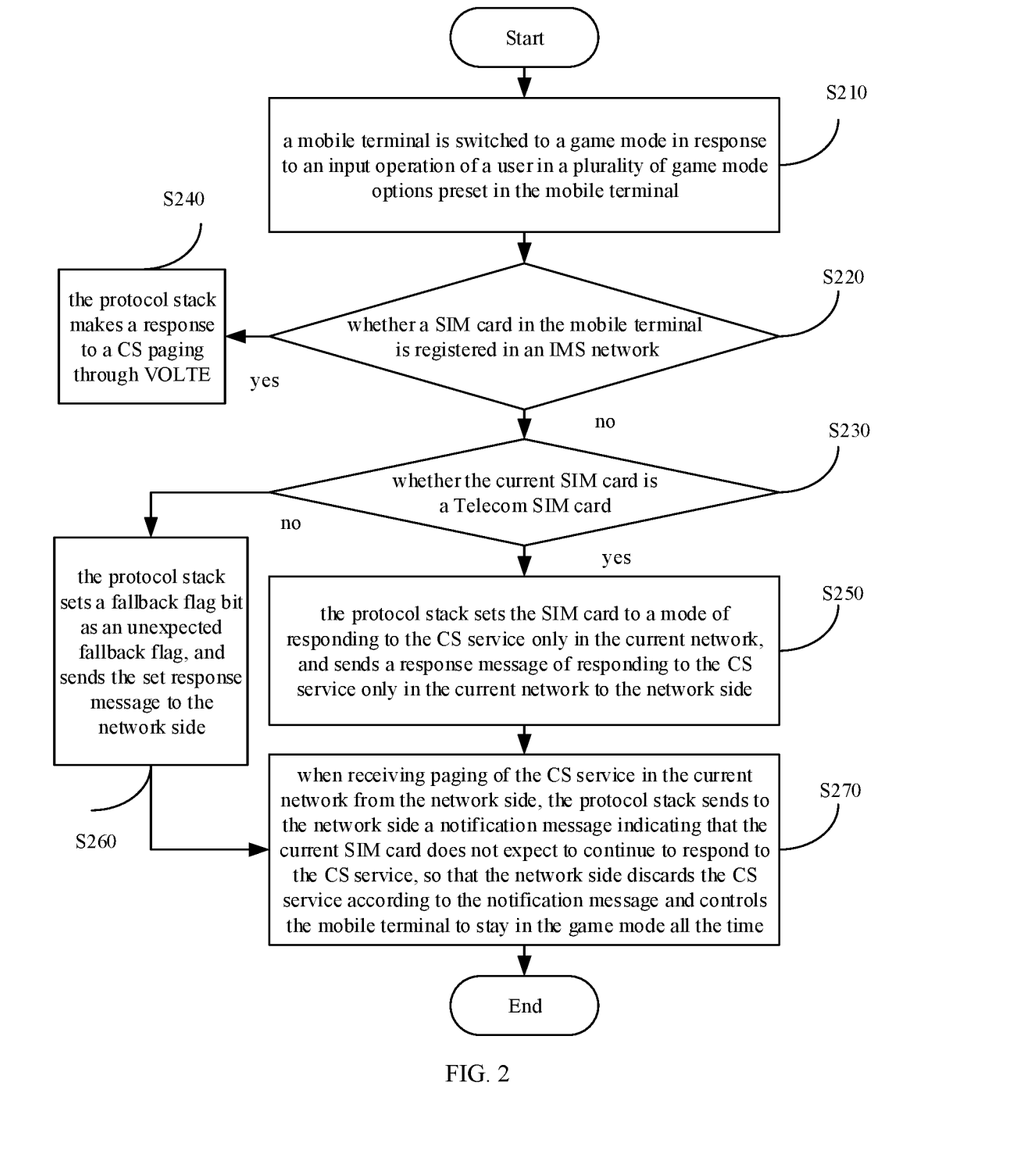
FIG. 2 is a flow diagram of a method for game interference processing according to embodiment two of the present application.

FIG. 2 is a flow diagram of a method for game interference processing according to embodiment two of the present application.

The method is applied to a mobile terminal, and a SIM card currently used in the mobile terminal can support a PS service and a CS service.

The method includes the following steps.

At step S210, a mobile terminal is switched to a game mode in response to an input operation of a user in a plurality of game mode options preset in the mobile terminal.

In some embodiments, the plurality of game mode options are preset in the mobile terminal, and a current working mode of the mobile terminal can be switched to the game mode according to a trigger operation of a user. The game mode is a mode in which any online game is in a running state.

The current mode may include a standby mode, a video mode, etc.

Further, the mobile terminal includes an AP (Application Processor) and a protocol stack. The AP and the protocol stack are set separately, and operations performed by the two parts are executed independently. When one part changes, the other part can still run normally, which reduces the coupling of the system and increases the autonomy of user design.

Figure 3:
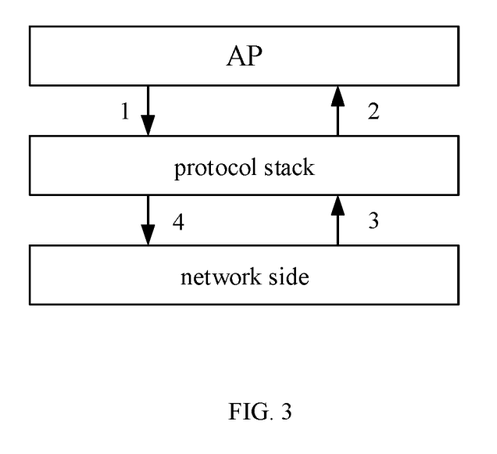
FIG. 3 is a schematic diagram showing a working flow of a mobile terminal in a game mode according to an embodiment of the present application.

For example, as shown in FIG. 3, 1 indicates that the user switches the mobile terminal to the game mode in response to the input operation of the user in the plurality of game mode options preset in the mobile terminal. When receiving the switching instruction of the user, the AP of the mobile terminal controls the mobile terminal to enter a predefined game mode and causes the protocol stack to execute the operation of the game mode.

2 indicates that after receiving the game mode instruction sent by the AP, the protocol stack feeds back the message of successful switching to the AP.

3 indicates that the network side pages the CS service to the protocol stack.

At step S220, whether a SIM card in the mobile terminal is registered in an IMS network is determined.

If the SIM card is not registered in the IMS network, it proceeds to step S230; and if the SIM card is registered in the IMS network, it proceeds to step S240.

At step S230, whether the current SIM card is a Telecom SIM card is determined.

The protocol stack determines whether the currently used SIM card is a Telecom SIM card. If the currently used SIM card is a Telecom SIM card, it proceeds to step S250; if the SIM card currently used is not a Telecom SIM card, it proceeds to step S260.

It is worth noting that the AP of the mobile terminal can also obtain current running resources of the mobile terminal, and compare the current running resource information with the resource information corresponding to a pre-stored online game. If the current running resource information is consistent with the resource information corresponding to the pre-stored online game, it is determined that the current mobile terminal is running the online game, and the AP controls the mobile terminal to enter the predefined game mode and causes the protocol stack to execute the operation of the game mode. The resource information may include a resource name, a resource ID, and the like.

At step S240, the protocol stack makes a response to a CS paging through VOLTE.

At step S250, the protocol stack sets the SIM card to a mode of responding to the CS service only in the current network, and sends a response message of responding to the CS service only in the current network to the network side.

In the Telecom SIM card, a mode of single card and dual standby is adopted. For example, the Telecom SIM card can receive the CS paging in both 4G network and 1× network, but can only receive the CS paging in the network corresponding to one system (4G or 1×) at a time point.

When the SIM card currently used is a Telecom SIM card, the protocol stack sets the current Telecom SIM card to send a response message of responding to the CS service only in the current network to the network side.

For example, as shown in FIG. 3, after receiving the CS page from the network side, 4 may indicate that the protocol stack directly sets an ability of receiving messages of the telecom SIM card in the 1× mode as disable, that is, the telecom SIM card is set to the 4G only mode, so that the mobile terminal can only receive the CS paging in the 4G network.

At step S260, the protocol stack sets a fallback flag bit as an unexpected fallback flag, and sends the set response message to the network side.

If the SIM card currently used by the mobile terminal is not a Telecom SIM card, that is, the SIM card currently used is a Mobile SIM card or a Unicom SIM card, the protocol stack makes a response to the network, and sends a response message to the network to inform the network side that the current network is not expected to fall back, so as to prevent the network side from constantly paging the mobile terminal of the user, resulting in signaling congestion of the network side.

For example, after receiving the CS paging, the protocol stack of the mobile terminal will send a response message to the network side. The response message of Extended service request has a fallback flag bit of csfb_response. If the fallback flag bit is 1, the network side will schedule the CS paging to drop to 3G or 2G to continue paging. If the fallback flag bit is 0, the network side will not continue to schedule resources for the CS paging.

As shown in FIG. 3, 4 may indicate that the protocol stack sets the fallback flag bit of csfb_response in the message of Extended service request to 0, and sends the set message of Extended service request to the network side. After receiving the response message, the network side will not continue to schedule resources for the CS paging.

At step S270, when receiving paging of the CS service in the current network from the network side, the protocol stack sends to the network side a notification message indicating that the current SIM card does not expect to continue to respond to the CS service, so that the network side discards the CS service according to the notification message, and controls the mobile terminal to stay in the game mode all the time.

Step S270 is the same as step S130, and will not be described in detail here.

Embodiment Three

Figure 4:
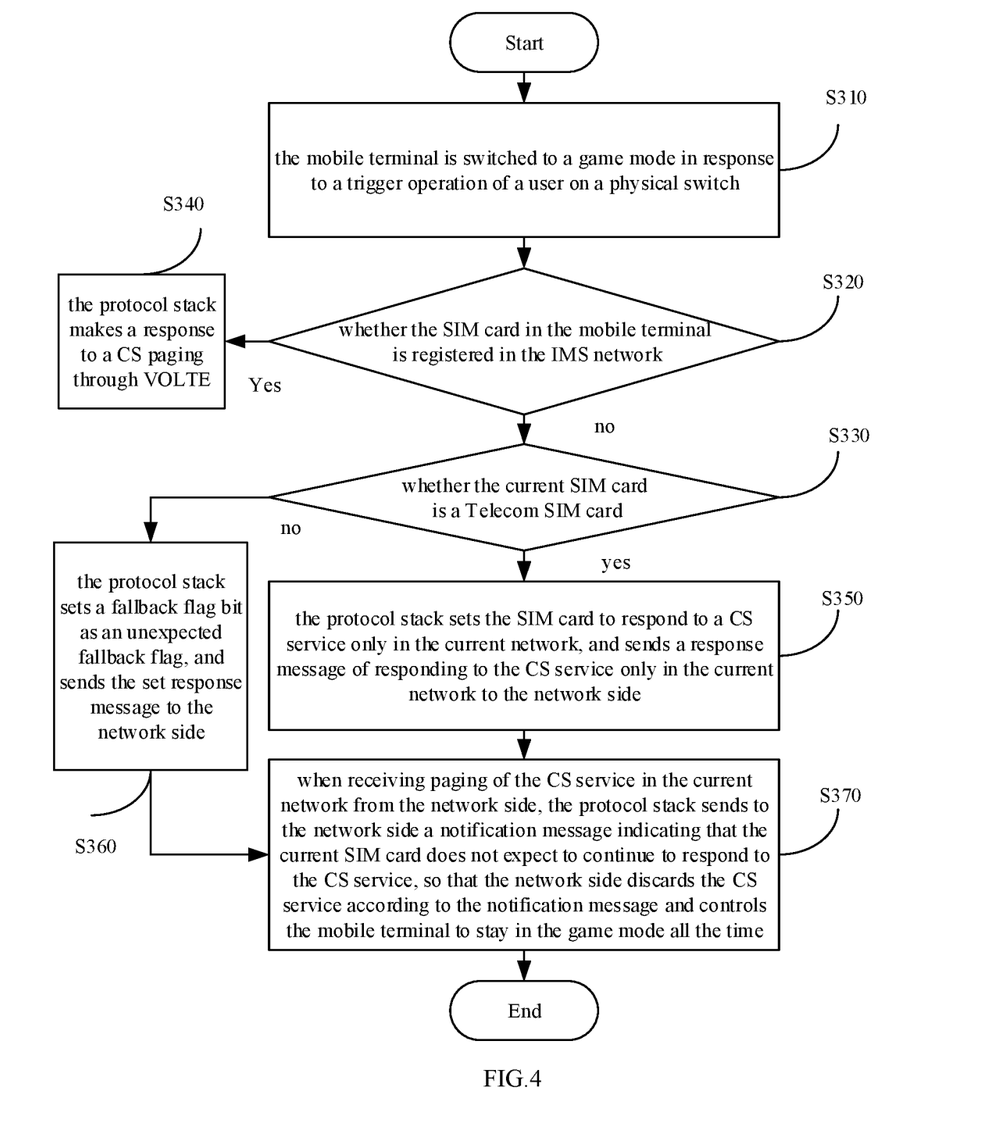
FIG. 4 is a flow diagram of a method for game interference processing according to embodiment three of the present application.

FIG. 4 is a flow diagram of a method for game interference processing according to embodiment three of the present application.

The method is applied to a mobile terminal, and a SIM card currently used in the mobile terminal can support a PS service and a CS service.

The method includes the following steps.

At step S310, the mobile terminal is switched to a game mode in response to a trigger operation of a user on a physical switch.

The mobile terminal is provided with a physical switch for switching a current working mode of the mobile terminal to a game mode.

The current working mode of the mobile terminal is switched to the game mode in response to the trigger operation of the user on the physical switch.

The physical switch may be arranged on the side of the mobile terminal at a position convenient for triggering by the user's finger, so that the user can conveniently and quickly switch the current working mode of the mobile terminal to the game mode.

At step S320, whether the SIM card in the mobile terminal is registered in the IMS network is determined.

Step S320 is the same as step S220, and will not be described in detail here.

At step S330, whether the current SIM card is a Telecom SIM card is determined.

Step S330 is the same as step S230, and will not be described in detail here.

At step S340, the protocol stack makes a response to a CS paging through VOLTE.

Step S340 is the same as step S240, and will not be described in detail here.

At step S350, the protocol stack sets the SIM card to respond to a CS service only in the current network, and sends a response message of responding to the CS service only in the current network to the network side.

Step S350 is the same as step S250, and will not be described in detail here.

At step S360, the protocol stack sets a fallback flag bit as an unexpected fallback flag, and sends the set response message to the network side.

Step S360 is the same as step S260, and will not be described in detail here.

At step S370, when receiving paging of the CS service in the current network from the network side, the protocol stack sends to the network side a notification message indicating that the current SIM card does not expect to continue to respond to the CS service, so that the network side discards the CS service according to the notification message, and controls the mobile terminal to stay in the game mode all the time.

Step S370 is the same as step S270, and will not be described in detail here.

Embodiment Four

Figure 5:
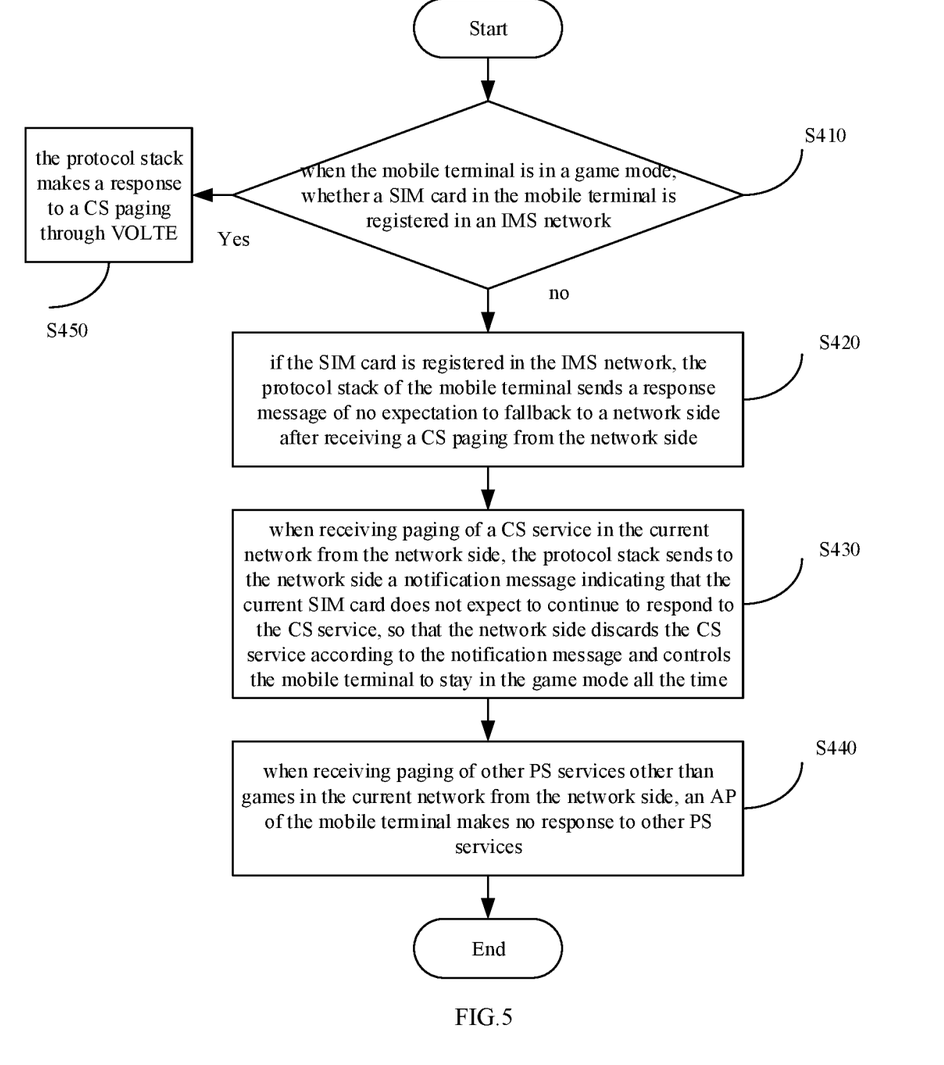
FIG. 5 is a flow diagram of a method for game interference processing according to embodiment four of the present application.

FIG. 5 is a flow diagram of a method for game interference processing according to embodiment four of the present application.

The method is applied to a mobile terminal, and a SIM card currently used in the mobile terminal can support a PS service and a CS service.

The method includes the following steps.

At step S410, when the mobile terminal is in a game mode, whether a SIM card in the mobile terminal is registered in an IMS network is determined.

If the SIM card is not registered in the IMS network, it proceeds to step S420; and if the SIM card is registered in the IMS network, it proceeds to step S450.

At step S420, if the SIM card is registered in the IMS network, the protocol stack of the mobile terminal sends a response message of no expectation to fallback to a network side after receiving a CS paging from the network side.

At step S430, when receiving paging of a CS service in the current network from the network side, the protocol stack sends to the network side a notification message indicating that the current SIM card does not expect to continue to respond to the CS service, so that the network side discards the CS service according to the notification message, and controls the mobile terminal to stay in the game mode all the time.

At step S440, when receiving paging of other PS services other than games in the current network from the network side, an AP of the mobile terminal makes no response to other PS services.

In the game mode, the SIM card currently used in the mobile terminal only supports the PS service, with the CS service being not supported. If the user is in the game mode, when the protocol stack receives other PS services except online games sent from the network side, the protocol stack makes a response to the PS services, and the AP of the mobile terminal does not display the PS service on the current game page to ensure the game experience.

The other PS services may include video chat, voice chat, text message, etc., which require instant interaction with users.

It is worth noting that step S440 may also be presented together with step S430, or step S440 may also be presented before step S430.

The games described in all the embodiments are online games that need to be connected to the Internet.

Embodiment Five

Figure 6:
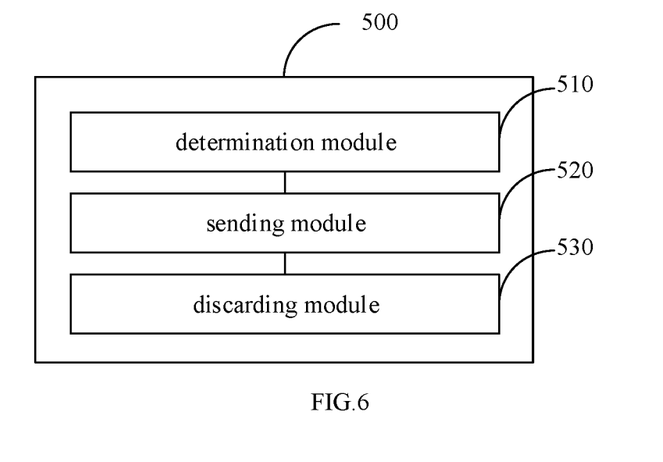
FIG. 6 is a structural schematic diagram of an apparatus for game interference processing according to an embodiment of the present application.

FIG. 6 is a structural schematic diagram of an apparatus for game interference processing according to an embodiment of the present application.

The apparatus is applied to a mobile terminal, and a SIM card currently used in the mobile terminal can support a PS service and a CS service.

The apparatus for game interference processing 500 includes a determination module 510, a sending module 520 and a discarding module 530.

The determination module 510 is configured to determine whether a SIM card in the mobile terminal is registered in an IMS network when the mobile terminal is in a game mode, where the game mode is a mode in which any online game is in a running state.

The sending module 520 is configured to send a response message of no expectation to fallback to the network side using a protocol stack after receiving a CS paging from the network side, when the SIM card is not registered in the IMS network.

The discarding module 530 is configured to send to the network side a notification message indicating that the current SIM card does not expect to continue to respond to a CS service using the protocol stack when receiving paging of the CS service in the current network from the network side, so that the network side discards the CS service according to the notification message, and control the mobile terminal to stay in the game mode all the time.

Further, the apparatus for game interference processing 500 also includes a response module:

The response module is configured to make a response to the CS paging through VOLTE using the protocol stack when the current network connected by the SIM card supports an IMS architecture.

Further, the response message also includes a fallback flag bit; and the sending module 520 further includes a first fallback unit.

The first fallback unit is configured to set the fallback flag bit as an unexpected fallback flag using the protocol stack when the SIM card is a Mobile SIM card or a Unicom SIM card, and send the set response message to the network side.

Further, the sending module 520 also includes a second fallback unit.

The second fallback unit is configured to set the SIM card to a mode of responding to the CS service only in the current network using the protocol stack when the SIM card is a Telecom SIM card, and send a response message of responding to the CS service only in the current network to the network side.

Further, the apparatus for game interference processing 500 also includes a first input module.

The first input module is configured to switch the mobile terminal to the game mode in response to an input operation of a user in a plurality of game mode options preset in the mobile terminal.

Further, the mobile terminal is provided with a physical switch; and the apparatus for game interference processing 500 also includes a second input module.

The second input module is configured to switch the mobile terminal to the game mode in response to a trigger operation of the user on the physical switch.

Further, the apparatus for game interference processing 500 also includes a paging module.

The paging module is configured to make an AP of the mobile terminal perform no response to other PS services when receiving paging of the other PS services except games in the current network from the network side.

Embodiment Six

Figure 7:
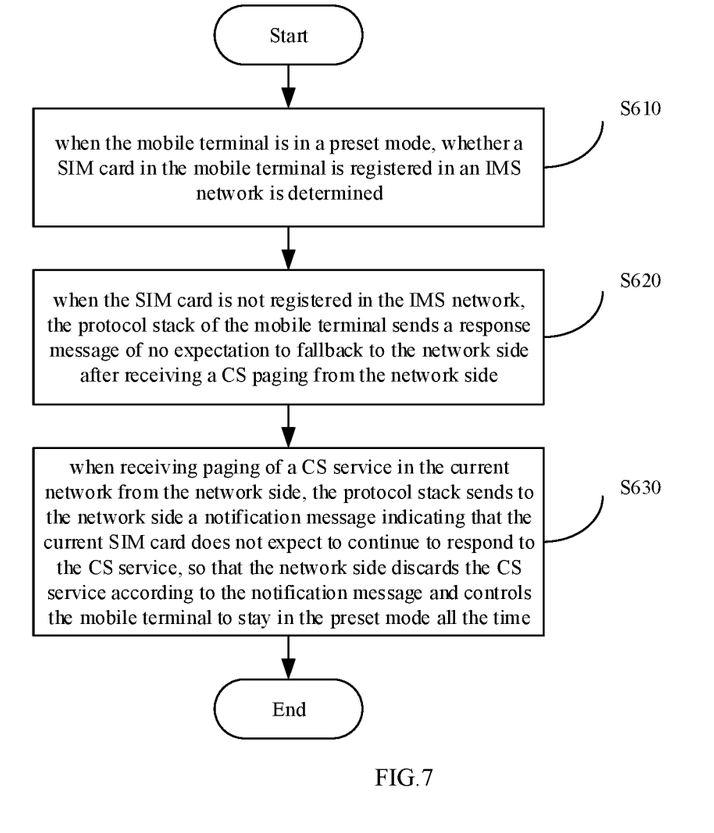
FIG. 7 is a flow diagram of a method for interference processing according to an embodiment of the present application.

FIG. 7 is a flow diagram of a method for interference processing according to embodiment six of the present application.

The method for interference processing is applied to a mobile terminal, and a SIM card currently used in the mobile terminal can support a PS service and a CS service.

The interference processing method includes the following steps.

At step S610, when the mobile terminal is in a preset mode, whether a SIM card in the mobile terminal is registered in an IMS network is determined.

The preset mode is a mode when a corresponding preset operation is executed, and the preset operation belongs to the PS service.

The preset operation may include game, shopping, video and other operations.

At step S620, when the SIM card is not registered in the IMS network, the protocol stack of the mobile terminal sends a response message of no expectation to fallback to the network side after receiving a CS paging from the network side.

It is worth noting that it is also possible to determine whether the current network connected by the SIM card in the mobile terminal supports the IMS architecture after receiving the CS paging from the network side.

At step S630, when receiving paging of a CS service in the current network from the network side, the protocol stack sends to the network side a notification message indicating that the current SIM card does not expect to continue to respond to the CS service, so that the network side discards the CS service according to the notification message, and controls the mobile terminal to stay in the preset mode all the time.

Figure 8:
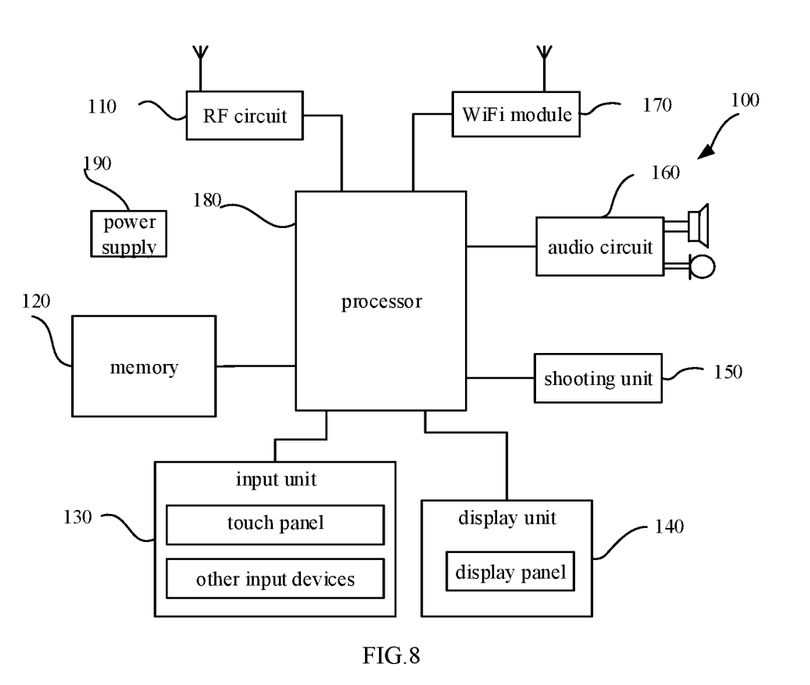
FIG. 8 is a schematic structural diagram of a mobile terminal according to an embodiment of the present application.

According to the present application, a mobile terminal is also provided, which may include a smart phone, a tablet computer and the like. As shown in FIG. 8, the mobile terminal 100 includes a Radio Frequency (RF) circuit 110, a memory 120, an input unit 130, a display unit 140, a shooting unit 150, an audio circuit 160, a wireless fidelity (WiFi) module 170, a processor 180, and a power supply 190. The input unit 130 may include a touch panel and may include other input devices, and the display unit 140 may include a display panel.

The components of the mobile terminal 100 will be described below with reference to FIG. 8.

The RF circuit 110 is used for receiving and transmitting wireless signals. The RF circuit 110 may be composed of a RF receiving circuit and a RF transmitting circuit. The RF circuit 110 may mainly include an antenna, a wireless switch, a receiving filter, a frequency synthesizer, high frequency amplifier, local oscillator for reception, frequency mixing, intermediate frequency, local oscillator for transmission, power amplifier control, power amplifier, etc.

The memory 120 is used for storing a program that supports the processor 180 to execute a method for sending a long message according to the following embodiments. The memory 120 may mainly include a program storage area and a data storage area, where the program storage area may store an operating system and an application program required by at least one function (such as a message sending function, a mode setting function, an image playing function, etc.); and the data storage area may store data (such as short messages, audio data, phone books, etc.) created according to the use of mobile phones. In addition, the memory 120 may include a high-speed random access memory, and may also include a nonvolatile memory, such as at least one magnetic disk memory device, a flash memory device, or other volatile solid-state memory devices.

The input unit 130 may be used for receiving input digital or character information and generating key signal input related to user settings and function control of the mobile terminal 100. The input unit 130 may include a touch panel and other input devices. The touch panel, also known as a touch screen, can collect the user's touch operations on or near the touch panel (such as the user's operation on or near the touch panel with any suitable objects or accessories such as fingers and stylus, etc.), and drive corresponding connecting device according to the preset program. In some embodiments, the touch panel may include a touch detection device and a touch controller. The touch detection device detects the touch orientation of the user, detects the signal brought by the touch operation, and transmits the signal to the touch controller. The touch controller receives touch information from the touch detection device, converts the touch information into contact coordinates, and then sends the contact coordinates to the processor 180. The touch controller can receive and execute commands sent from the processor 180. In addition, the touch panel can be implemented by various types such as resistive, capacitive, infrared and surface acoustic wave. In addition to the touch panel, the input unit 130 may also include other input devices. The other input devices may include, but are not limited to, one or more of physical keyboard, function keys (such as volume control keys, switch keys, etc.), trackball, mouse, joystick, etc.

The display unit 140 may be used for displaying information input by the user or provided to the user, as well as various menus and interfaces of the mobile terminal 100, such as a game interface. The display unit 140 may include a display panel. In some embodiments, the display panel may be configured in the form of a liquid crystal display (LCD) or an organic light-emitting diode (OLED). Further, the touch panel may cover the display panel, and when the touch panel detects a touch operation on or near the touch panel, the touch operation is transmitted to the processor 180 to determine the type of touch event, and then the processor 180 provides corresponding visual output on the display panel according to the type of touch event. Although the touch panel and the display panel are two independent components to realize the input and output functions of the mobile phone, in some embodiments, the touch panel and the display panel can be integrated to realize the input and output functions of the mobile phone.

The shooting unit 150 is used for collecting image information within an imaging range. The shooting unit 150 may be a camera, and the camera may include a photosensitive device including but not limited to CCD (Charge Coupled apparatus) and CMOS (Complementary Metal-Oxide Semiconductor). The photosensitive device converts light change information into electric charges, and converts the converted electric charges into digital signals through analog-to-digital conversion. The digital signals are stored in a flash memory or a built-in hard disk card inside the shooting unit 150 after being compressed. Therefore, the stored digital signals can be transmitted to the processor 180, and the processor 180 processes the digital signals according to requirements or instructions.

The audio circuit 160 may provide an audio interface between the user and the mobile terminal 100.

WiFi is a short-distance wireless transmission technology, and the mobile terminal 100 can help users to send and receive e-mails, browse web pages and access streaming media through the wireless fidelity module 170 (hereinafter referred to as WiFi module), which provides wireless broadband internet access for users. Although FIG. 1 shows a WiFi module, it can be understood that it is not a necessary component of the mobile terminal 100, and can be omitted as needed within the scope of not changing the essence of the present application.

The processor 180 is the control center of the mobile terminal 100, which connects various parts of the whole mobile terminal 100 by using various interfaces and lines, runs or executes software programs and/or modules stored in the memory 120, and calls data stored in the memory 120, so that the mobile terminal 100 can execute all the above-mentioned methods or functions of various modules in all the above-mentioned devices. Optionally, the processor 180 may include one or more processing units. Preferably, the processor 180 may be integrated with an application processor, which mainly processes an operating system, a user interface, an application program, and the like. The processor 180 may integrate modem processor, or the modem processor may not be integrated into the processor 180.

The power supply 190 can be logically connected to the processor 180 through the power management system, so that the functions of charge management, discharge management and power consumption management can be realized through the power management system.

It can be understood by those having ordinary skill in the art that the structure of the mobile terminal 100 shown in FIG. 8 does not constitute a limitation of the mobile terminal, and may include more or fewer components than shown, or combine some components, or arrange different components.

According to this embodiment, a computer storage medium is also provided, where the computer storage medium is used for storing the computer program used in the mobile terminal.

According to the embodiments, a method and an apparatus for game interference processing, and a mobile terminal are provided. When the mobile terminal is in a game mode, if a protocol stack of the mobile terminal receives paging of a CS service from a network side, the protocol stack informs the network side of a message of no expectation to fallback, so that the network side can only page the CS service in the current network, thus avoiding the problem of game interruption caused by network speed drop after the network falls back. The game mode is defined in an innovative manner, when the game mode is started, the protocol stack only makes a response to PS service, but makes no response to CS service from the network side, avoiding the problem that users are interrupted by voice service in game state and improving user experience. The mobile terminal can be switched to the game mode through preset game mode options or physical keys, with one-click switching. When the mobile terminal is in a preset mode (such as games, shopping, video, etc.), if the protocol stack of the mobile terminal receives paging of the CS service from the network side, the protocol stack informs the network side of a message of no expectation to fallback, so that the network side can only page the CS service on the current network. When the protocol stack receives paging of the CS service from the network side, the protocol stack makes according to the predefined preset mode, the network side discard the CS service according to the notification message, and controls the mobile terminal to stay in the preset mode all the time to avoid fallback in the network.

In several embodiments provided in this application, it should be understood that the disclosed apparatus and method may also be implemented in other ways. The above-described apparatus embodiments are only schematic. For example, the flowcharts and structural diagrams in the drawings show the architecture, functions and operations of possible implementations of apparatus, methods and computer program products according to various embodiments of the present application. In this regard, each block in the flowchart or block diagram may represent a module, program segment or part of code containing one or more executable instructions for implementing specified logical functions. It should also be noted that in alternative implementations, the functions noted in the blocks may also occur in a different order from those noted in the drawings. For example, two consecutive blocks can actually be executed in substantially parallel, and sometimes be executed in reverse order, depending on the functions involved. It should also be noted that each block in the structural diagram and/or flowchart, and the combination of blocks in the structural diagram and/or flowchart, can be implemented by a dedicated hardware-based system that performs specified functions or actions, or can be implemented by a combination of dedicated hardware and computer instructions.

In addition, the functional modules or units in each embodiment of this application can be integrated together to form an independent part, or each module can exist alone, or two or more modules can be integrated to form an independent part.

When the functions are realized in the form of software function modules and sold or used as independent products, they can be stored in a computer readable storage medium. Based on this understanding, the technical scheme of this application can be embodied in the form of a software product, which is stored in a storage medium and includes several instructions to make a computer device (which may be a smart phone, a personal computer, a server, or a network apparatus, etc.) execute all or part of the steps of the method described in each embodiment of this application. The aforementioned storage media include: U disk, mobile hard disk, ROM (Read-Only Memory), RAM (Random Access Memory), magnetic disk or optical disk, etc., which can store program codes.

The above is only a specific implementation mode of this application, but the protection scope of this application is not limited to this. Any person familiar with the technical field can easily think of changes or substitutions within the technical scope disclosed in this application, which should be covered in the protection scope of this application.

The invention claimed is:

1. A method for game interference processing applied to a mobile terminal, comprising:
    determining whether a SIM card in the mobile terminal is registered or not registered in an IMS network when the mobile terminal is in a game mode, wherein the game mode is a mode in which any online game is in a running state;
    based on the determination that the SIM card is not registered in the IMS network, sending, by a protocol stack of the mobile terminal, a response message of no expectation to fallback to a network side after receiving a CS paging from the network side; and
    sending, by the protocol stack, to the network side a notification message indicating that the current SIM card does not expect to continue to respond to a CS service when receiving paging of the CS service in the current network from the network side, so that the network side discards the CS service according to the notification message, and controlling the mobile terminal to stay in the game mode all the time.

2. The method for game interference processing of claim 1, further comprising:
    making, by the protocol stack, a response to the paging through VOLTE when the SIM card is registered in the IMS network.

3. The method for game interference processing of claim 1, wherein the response message comprises a fallback flag bit;
    sending, by the protocol stack of the mobile terminal, the response message of no expectation to fallback to the network side comprises:
    setting, by the protocol stack, the fallback flag bit as an unexpected fallback flag when the SIM card is a Mobile or Unicorn SIM card, and sending the set response message to the network side.

4. The method for game interference processing of claim 1, wherein, sending, by the protocol stack of the mobile terminal, the response message of no expectation to fallback to the network side comprises:
    setting, by the protocol stack, the SIM card to a mode of responding to the CS service only in the current network when the SIM card is a Telecom SIM card, and sending a response message of responding to the CS service only in the current network to the network side.

5. The method for game interference processing of claim 1, wherein before the mobile terminal is in the game mode, the method comprises:
    switching the mobile terminal to the game mode in response to an input operation of a user in a plurality of game mode options preset by the mobile terminal.

6. The method for game interference processing of claim 1, wherein the mobile terminal is provided with a physical switch; and
    before the mobile terminal is in the game mode, the method comprises:
    switching the mobile terminal to the game mode in response to a trigger operation of the user on the physical switch.

7. The method for game interference processing of claim 1, further comprising:
    making, by an AP of the mobile terminal, no response to other PS services except games when receiving paging of the other PS services in the current network from the network side.

8. A mobile terminal, comprising a memory for storing a computer program and a processor, wherein the processor executes the computer program to make the mobile terminal perform the following steps:
    determining whether a SIM card in the mobile terminal is registered or not registered in an IMS network when the mobile terminal is in a game mode, wherein the game mode is a mode in which any online game is in a running state;
    based on the determination that the SIM card is not registered in the IMS network, sending, by a protocol stack of the mobile terminal, a response message of no expectation to fallback to a network side after receiving a CS paging from the network side; and
    sending, by the protocol stack, to the network side a notification message indicating that the current SIM card does not expect to continue to respond to a CS service when receiving paging of the CS service in the current network from the network side, so that the network side discards the CS service according to the notification message, and controlling the mobile terminal to stay in the game mode all the time.

9. The mobile terminal of claim 8, wherein the processor executes the computer program to make the mobile terminal further perform the following steps:
    making, by the protocol stack, a response to the paging through VOLTE when the SIM card is registered in the IMS network.

10. The mobile terminal of claim 8, wherein the response message comprises a fallback flag bit; and when the processor executes the computer program to realize the step of sending, by the protocol stack of the mobile terminal, the response message of no expectation to fallback to the network side, the mobile terminal performs the following steps:
    setting, by the protocol stack, the fallback flag bit as an unexpected fallback flag when the SIM card is a Mobile or Unicom SIM card, and sending the set response message to the network side.

11. The mobile terminal of claim 8, wherein when the processor executes the computer program to realize the step of sending, by the protocol stack of the mobile terminal, the response message of no expectation to fallback to the network side, the mobile terminal executes the following steps:
    setting, by the protocol stack, the SIM card to a mode of responding to the CS service only in the current network when the SIM card is a Telecom SIM card, and sending a response message of responding to the CS service only in the current network to the network side.

12. The mobile terminal of claim 8, wherein before the processor executes the computer program to realize "the mobile terminal is in the game mode", the processor executes the computer program to make the mobile terminal further perform the following steps:
    switching the mobile terminal to the game mode in response to an input operation of a user in a plurality of game mode options preset in the mobile terminal.

13. The mobile terminal of claim 8, wherein the mobile terminal is provided with a physical switch; and before the processor executes the computer program to realize the "the mobile terminal is in the game mode", the processor executes the computer program to make the mobile terminal further perform the following steps:
    switching the mobile terminal to the game mode in response to a trigger operation of the user on the physical switch.

14. The mobile terminal of claim 8, wherein the processor executes the computer program to make the mobile terminal further performs the following steps:
    making, by an AP of the mobile terminal, no response to other PS services except games when receiving paging of the other PS services in the current network from the network side.

15. A method for interference processing applied to a mobile terminal, comprising:
    determining whether a SIM card in the mobile terminal is registered or not registered in an IMS network when the mobile terminal is in a preset mode, wherein the preset mode is a mode when a corresponding preset operation is executed, and the preset operation corresponds to a PS service;
    based on the determination that the SIM card is not registered in the IMS network, sending, by a protocol stack of the mobile terminal, a response message of no expectation to fallback to a network side after receiving a CS paging from the network side; and
    sending, by the protocol stack, to the network side a notification message indicating that the current SIM card does not expect to continue to respond to a CS service when receiving paging of the CS service in the current network from the network side, so that the network side discards the CS service according to the notification message and controls the mobile terminal to stay in the preset mode all the time.

* * * * *